United States Patent
Kida et al.

[11] Patent Number: 6,153,336
[45] Date of Patent: Nov. 28, 2000

[54] LITHIUM SECONDARY BATTERY

[75] Inventors: Yoshinori Kida, Katano; Masahisa Fujimoto, Osaka; Toshiyuki Nohma; Koji Nishio, both of Hirakata, all of Japan

[73] Assignee: Sanyo Electric Co., Ltd., Osaka, Japan

[21] Appl. No.: 09/141,354

[22] Filed: Aug. 27, 1998

[30] Foreign Application Priority Data

Aug. 27, 1997 [JP] Japan .................................... 9-247777

[51] Int. Cl.$^7$ .................................................. H01M 4/48
[52] U.S. Cl. ............................................................. 429/231.1
[58] Field of Search ........................................... 429/231.1

[56] References Cited

U.S. PATENT DOCUMENTS

| H1076 | 7/1992 | Slane et al. | 429/194 |
|---|---|---|---|
| 5,464,708 | 11/1995 | Neat et al. | 429/218 |
| 5,531,920 | 7/1996 | Mao et al. | 252/182.1 |
| 5,545,468 | 8/1996 | Koshiba et al. | 429/218 |
| 5,686,138 | 11/1997 | Fujimoto et al. | 429/197 |
| 5,766,796 | 6/1998 | Abraham et al. | 429/192 |

FOREIGN PATENT DOCUMENTS

WO97/48141  12/1997  WIPO .

OTHER PUBLICATIONS

Ohzuku et al., Journal of Power Sources, vol. 54, pp. 99–102 (no month available), 1995.

David Linden, editor, "Handbook of Batteries, second edition", pp. 36.4 to 36.9 (no month available), 1995.

*Primary Examiner*—Carol Chaney
*Attorney, Agent, or Firm*—Kubovcik & Kubovcik

[57] ABSTRACT

A lithium secondary battery includes a positive electrode having a complex oxide of lithium and titanium as an active material, the composition of which before initial discharge is represented by $Li_xTi_{3-x}O_4$ ($1 \leq x \leq 1.5$), a negative electrode having an intercalation compound as an active material, the composition of which before initial discharge is represented by $C_yLi$ ($6 \leq y \leq 6.5$), and a nonaqueous electrolyte. A low voltage lithium secondary battery having about 1.5 V of discharge voltage is provided.

7 Claims, 3 Drawing Sheets

LITHIUM SECONDARY BATTERY

FIELD OF THE INVENTION

The present invention relates to a lithium secondary battery, and more specifically to 1.5V class lithium battery of discharge start which is suitable as a driving electric source for a low voltage driving Integrated Circuit (hereinafter referred as IC) and the like. The secondary battery of discharge start is a secondary battery which can have an initial discharge without a charge in advance.

BACKGROUND OF THE INVENTION

Lithium batteries have lately attracted attention as high energy density batteries, and, therefore, it is possible to miniaturize and to lighten the weight of batteries.

$LiCoO_2$, $LiNiO_2$ and $LiMn_2O_4$ are well known as a positive electrode material for a lithium battery. Lithium alloys and carbon materials are well known as a negative electrode material for lithium secondary batteries.

In the field of this kind of secondary batteries, it has been tried to develop higher voltage batteries or higher output power density batteries. A 4V class battery using $LiCoO_2$ and carbon material for a positive and a negative electrode, respectively, has been introduced in the market.

Japanese Patent publication (Laid-Open) Hei 8-180875 discloses a high output power density lithium secondary battery, 4.5V class of discharge voltage, comprising a positive electrode having $Li_xTi_yO_4$ (in which $0<x\leq2$ and $1<y\leq3$) or $Li_aTi_bM_cO_4$ (in which $0<a\leq2$, $1<b\leq3$ and $0<c\leq3$, and M is at least one element selected from the group consisting of Mn, Fe, Cr, Ni, Co, Mg and B), and a negative electrode containing lithium metal, lithium alloy or carbon material.

On the other hand, however, development has also been conducted of lower voltage driving type batteries to reduce uptake electric power of IC. It is required to develop a lithium secondary batteries having lower discharge voltage as a driving electric source for the IC.

The present invention has been completed to satisfy such requirements. An object of the present invention is to provide a lithium secondary battery having about 1.5 V of discharge voltage and being preferable as a driving electric source for a low voltage driving type IC and the like.

SUMMARY OF THE INVENTION

A lithium secondary battery of the present invention comprises a positive electrode having a complex oxide of lithium and titanium as an active material, the composition of which before initial discharge is represented by $Li_xTi_{3-x}O_4$ ($1\leq x\leq1.5$), a negative electrode having an intercalation compound as an active material, the composition of which before initial discharge is represented by $C_yLi$ ($6\leq y\leq6.5$), and an electrolyte.

DESCRIPTION OF PREFERRED EMBODIMENTS

Figure 1:
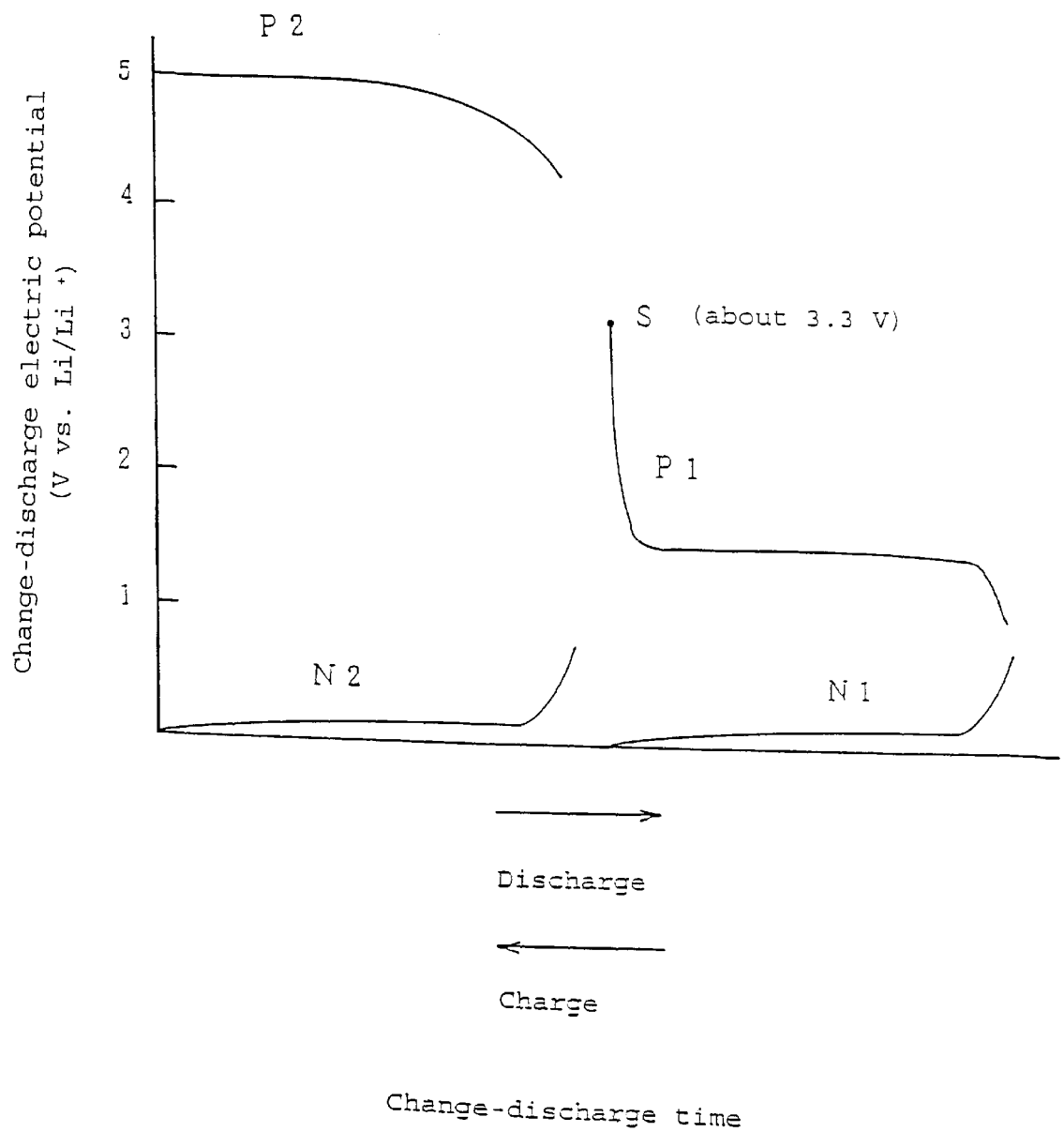
FIG. 1 is a graph showing principles of the present invention.

As the complex oxide of lithium and titanium represented by $Li_xTi_{3-x}O_4$ ($1\leq x\leq1.5$), $Li_{4/3}Ti_{5/3}O_4$ is preferable for obtaining a lithium secondary battery having an excellent charge-discharge cycle property. This is because this complex oxide having a Ti valence of +4 is unlikely to be oxidized further and has a stable condition to have little change of structure accompanied with intercalation or deintercalation of lithium.

The intercalation compound represented by $C_yLi$ ($6\leq y\leq6.5$) is a compound in which lithium is intercalated between layers of a carbon material having a layered crystal structure to provide an atomic ratio of lithium to carbon of 1:6 to 1:6.5. As concrete examples of the carbon materials having a layered crystal structure, natural graphite and artificial graphite that is produced by the heat treatment of a soft carbon, for example coke, can be illustrated. Intercalation of lithium into carbon material layers can be conducted electrochemically, that is, a carbon electrode is immersed into an electrolyte with a source of lithium, for example a lithium film, and is discharged. It is also possible that a predetermined amount, which should be intercalated into a carbon electrode, of a source of lithium added in a battery can when a battery is assembled, to intercalate lithium into layers of carbon material in a certain period, usually about 24 hours.

A ratio of the complex oxide and carbon in the intercalation compound can be 1:0.2 to 1:0.5 and is preferably 1:0.25 to 1:0.45 by weight. If the ratio of carbon to the complex oxide is smaller than 0.25, overdischarge of the negative electrode occurs, and is likely to elute a current collector material, for example, copper and the like. If the ratio of carbon to the complex oxide is greater than 0.45, overdischarge of the positive electrode occurs, and the structure of the complex oxide is likely to be deteriorated. Either a lower or higher ratio causes a lessening of charge-discharge cycle properties.

The electrolyte is not particularly limited. A nonaqueous electrolyte is preferable and known nonaqueous electrolytes for lithium secondary batteries can be used for the battery of the present invention. As a solvent of the nonaqueous electrolyte, a cyclic carbonate, for example ethylene carbonate, propylene carbonate, vinylene carbonate, butylene carbonate and the like, and mixtures of the cyclic carbonate and a low-boiling point solvent, for example dimethyl carbonate, diethyl carbonate, methyl ethyl carbonate, 1,2-dimethoxyethane, 1,2-diethoxyethane, ethoxymethoxyethane and the like can be illustrated. As a solute dissolved in the solvent there can be mentioned $LiPF_6$, $LiAsF_6$, $LiSbF_6$, $LiBF_4$, $LiClO_4$, $LiN(CF_3SO_2)_2$, $LiCF_3SO_3$, $LiCF_3(CF_2)_3SO_3$ and the like. A gel nonaqueous electrolyte or a solid electrolyte can be used instead of liquid nonaqueous electrolyte.

Discharge voltage of the battery of the present invention is about 1.5V because the ratio, before initial discharge, of the positive electrode active material, i.e., the complex oxide of lithium and titanium, and the negative electrode active material, i.e., the intercalation compound in which lithium is intercalated between carbon material layers is controlled. The reason is explained below in conjunction with FIG. 1.

FIG. 1 is a graph showing the charge-discharge electric potential (V vs. Li/Li$^+$) of the battery on the axis of the ordinate, and the charge-discharge time on the axis of the abscissa to explain the principle of the present invention. From left to right indicates discharge, and from right to left indicates charge. Curves P1 and N1 are the charge-discharge curves of the positive and negative electrode of the present invention, respectively, at the time of discharge start. Curves P2 and N2 are shown for comparison. They are charge-discharge curves of a positive and a negative electrode disclosed in Japanese patent publication (Laid-Open) Hei 8-180875, i.e., a carbon material (C) is used for a negative electrode for a conventional charge start battery.

When the battery of the present invention is discharged, lithium ion is released from the intercalation compound, and the lithium ion is occluded in the complex oxide of lithium and titanium. The complex oxide represented by $Li_xTi_{3-x}O_4$ ($1 \leq x \leq 1.5$, before initial discharge) having about 1.5V (vs. Li/Li$^+$) of discharge electric potential (electric potential of the flat portion of the curve P1) is used as the positive active material for the battery of the present invention, and the discharge voltage becomes about 1.5V (1.3~1.5V) as shown in FIG. 1. The electric potential (maximum electric potential) is about 3.3V at the discharge start (point S in FIG. 1). If a complex oxide having x less than 1 in the formula, $Li_xTi_{3-x}O_4$, is used, the electric potential of the positive electrode becomes higher, and the discharge voltage is greater than 1.5V. If a complex oxide having x greater than 1.5 in the formula, $Li_xTi_{3-x}O_4$, is used, a battery having 1.5V of electric potential can be obtained, however, the greater the value of x, the smaller the battery capacity.

When the battery of the invention is charged, lithium ion is released from the complex oxide, and lithium ion is occluded in the intercalation compound. Only almost the same amount of lithium ion as the amount released from the intercalation compound during discharge, i.e., almost the same amount of lithium ion is occluded in the complex oxide, is released from the complex oxide during charge because the intercalation compound represented by $C_yLi$ ($6 \leq y \leq 6.5$, before initial discharge) is used for the battery of the present invention. Therefore, a positive electric potential cannot be higher than the electric potential at starting discharge, i.e., 3.3V (vs. Li/Li$^+$). That is, the positive electrode of the battery of the present invention cannot be charged to the level shown for P2, which is between 3.5~5.3V of the charge-discharge electric potential, shown in FIG. 1 as the charge-discharge curve of the positive electrode of the conventional battery. The battery of the present invention which has about 1.5V of discharge voltage is suitable, for example, for a driving electric power source of a low voltage driving IC. If the intercalation compound having y greater than 6.5 in $C_yLi$ is used, battery capacity is dramatically reduced. It is necessary to use the intercalation compound which has y of no greater than 6.5.

EXAMPLES

The present invention is described below in detail. The examples illustrate the invention and are not intended to be limiting thereof. It is of course possible that modifications can be made within the scope of the invention.

Example 1

[Preparation of positive electrode]

$Li_{4/3}Ti_{5/3}O_4$ as a positive electrode active material, artificial graphite as an electric conductor and polyfluorovinylidene as a binding agent were mixed in a ratio of 90:5:5 by weight, and then N-methyl-2-pyrolidone (NMP) was added to prepare a slurry. The slurry was coated on both sides of an aluminum film as a positive electrode collector by a doctor blade, and the film was heated at 150° C. for two hours under vacuum to prepare a positive electrode.

[Preparation of negative electrode]

A graphite (interlayer spacing $d_{002}$=3.35 Å) and polyfluorovinylidene as a binding agent were mixed in a ratio of 95:5 by weight, then N-methyl-2-pyrolidone (NMP) was added to prepare a slurry. The slurry was coated on both sides of a copper film as a negative electrode collector by a doctor blade, and the film was heated at 150° C. for two hours under vacuum to prepare a negative electrode. The amount of graphite for the negative electrode was adjusted to provide a ratio of $Li_{4/3}Ti_{5/3}O_4$ (the positive electrode active material) to graphite of 1:0.4 by weight. Then the negative electrode prepared above (used as a cathode here) and a lithium film (used as an anode here) were immersed in a nonaqueous electrolyte which was prepared by dissolving $LiPF_6$ in a 1:1 by volume mixed solvent of ethylene carbonate and dimethyl carbonate to a concentration of 1 mol/l, and an amount of electric current of 372 mAh per 1 g of graphite at 0.1 mA/cm$^2$ was passed to prepare the negative electrode having the intercalation compound $C_6Li$ as a negative electrode active material.

[Preparation of Nonaqueous electrolyte]

$LiPF_6$ was dissolved in a 1:1 by volume mixed solvent of ethylene carbonate and dimethyl carbonate to a concentration of 1 mol/l to prepare the nonaqueous electrolyte.

[Preparation of lithium secondary battery]

A cylindrical lithium secondary batttery of the present invention (A1), size AA, was prepared from the above positive electrode, negative electrode and the nonaqueous electrolyte. Polypropylene microporous membrane was used as a separator.

Example 2

A battery A2 was prepared in the same manner as Example 1 except that the intercalation compound represented by $C_{6.5}Li$ which was prepared by using an amount of electric current of 343 mAh per 1 g of graphite was used as a negative electrode active material instead of $C_6Li$.

Example 3

A battery A3 was prepared in the same manner as Example 1 except that $LiTi_2O_4$ was used as a positive electrode active material instead of $Li_{4/3}Ti_{5/3}O_4$.

Example 4

A battery A4 was prepared in the same manner as Example 2 except that $Li_{1.5}Ti_{1.5}O_4$ was used as a positive electrode active material instead of $Li_{4/3}Ti_{5/3}O_4$.

Example 5

A battery A5 was prepared in the same manner as Example 1 except that the ratio of $Li_{4/3}Ti_{5/3}O_4$ to graphite was adjusted to 1:0.2 when the negative electrode was prepared.

Example 6

A battery A6 was prepared in the same manner as Example 1 except that the ratio of $Li_{4/3}Ti_{5/3}O_4$ to graphite was adjusted to 1:0.25 when the negative electrode was prepared.

Example 7

A battery A7 was prepared in the same manner as Example 1 except that the ratio of $Li_{4/3}Ti_{5/3}O_4$ to graphite was adjusted to 1:0.45 when the negative electrode was prepared.

Example 8

A battery A8 was prepared in the same manner as Example 1 except that the ratio of $Li_{4/3}Ti_{5/3}O_4$ to graphite was adjusted to 1:0.5 when the negative electrode was prepared.

[Discharge capacity and charge-discharge properties of each battery]

Figure 2:
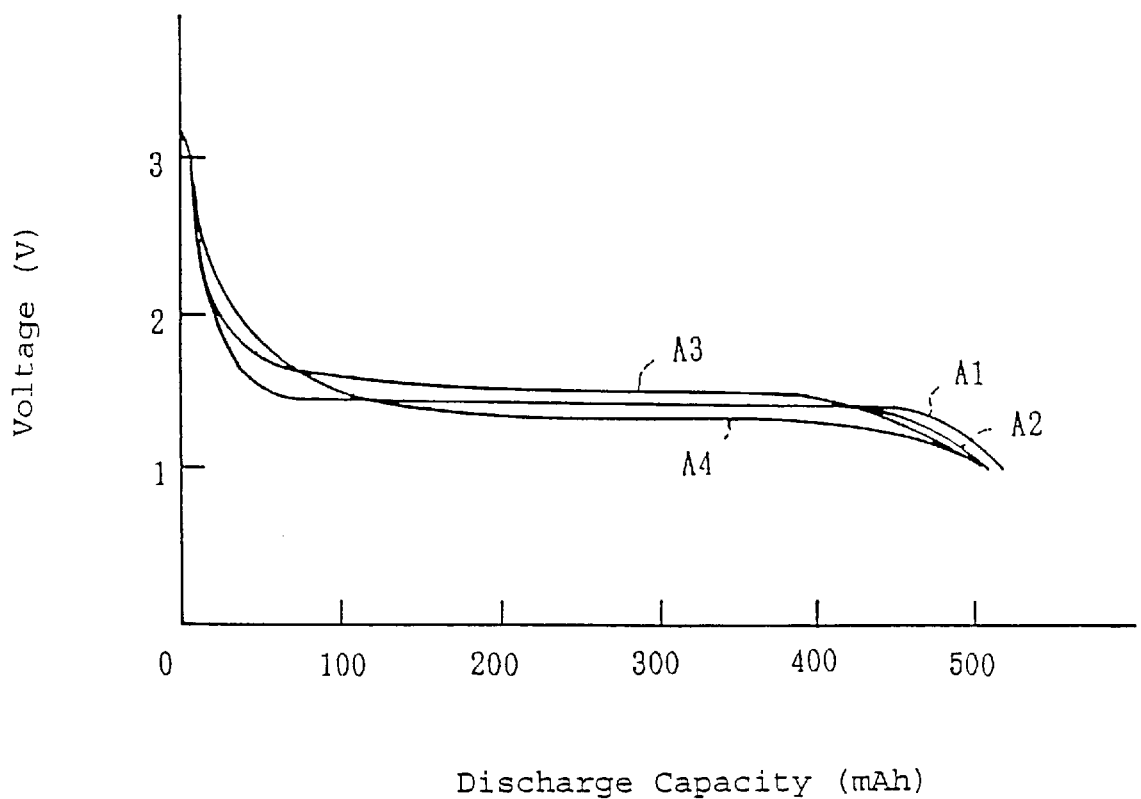
FIG. 2 is a graph showing the discharge curves of the first cycle of charge-discharge cycles of the present invention.
Figure 3:
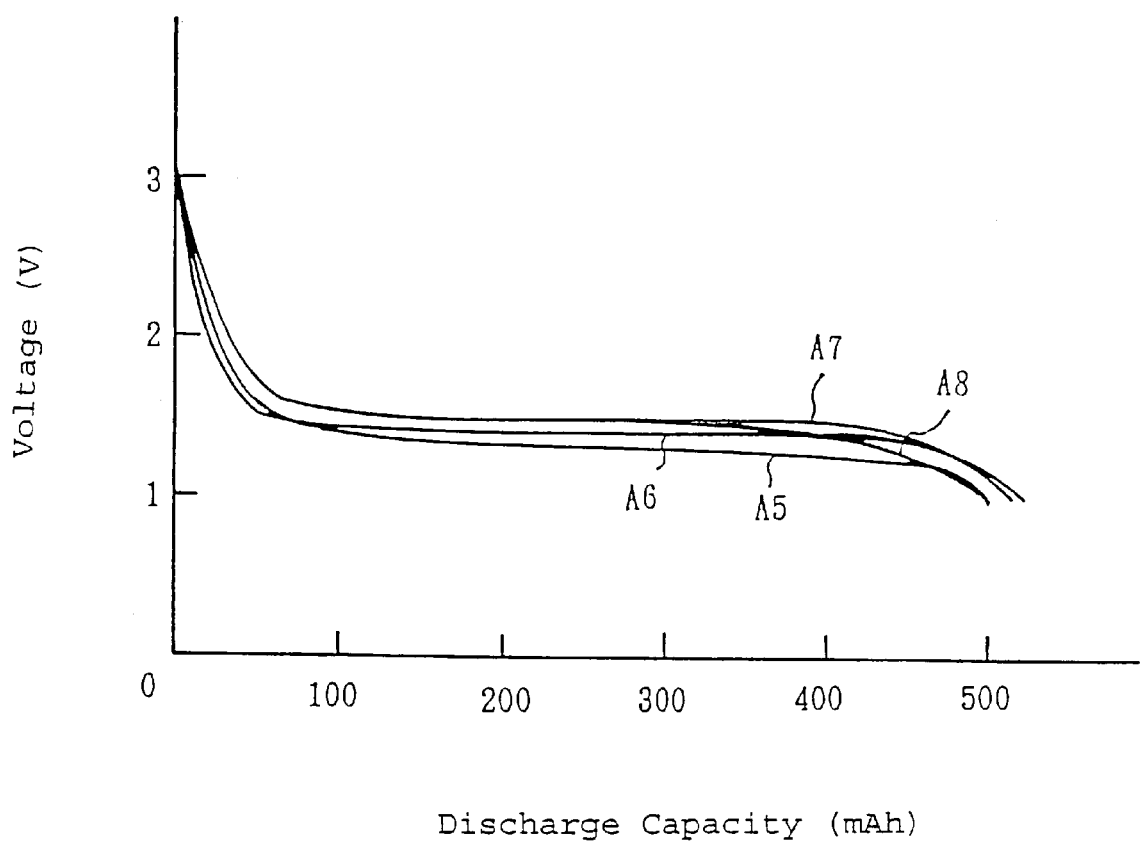
FIG. 3 is also a graph showing the discharge curves of the first cycle of charge-discharge cycles of the present invention.

Charge and discharge cycles were repeated 500 times (charged to 3.4V at 500 mA, and discharged to 1.5V at 500 mA). For each battery, discharge capacity (mAh) at the first cycle and discharge voltage (V) and capacity reduction rate (%/cycle) per each cycle up to 500 cycles were measured as defined below. The results are shown in Table 1, FIG. 2 and FIG. 3. FIGS. 2 and 3 are graphs showing a discharge curve of each battery at the first cycle. In FIGS. 2 and 3 battery voltage (V) is shown on the ordinate, and discharge capacity (mAh) is shown on the abscissa.

Capacity reduction rate (%/cycle)={(C1−C2)×100}/(C1× 500) In the formula, C1 is the discharge capacity at the first cycle, and C2 is the discharge capacity at the 500th cycle.

TABLE 1

| Battery | Positive electrode active material | Negative electrode active material | Ratio by weight of positive electrode active material to carbon in negative electrode active material | Discharge capacity (mAh) | Discharge voltage (V) | Capacity reduction rate (%/cycle) |
|---|---|---|---|---|---|---|
| A1 | $Li_{4/3}Ti_{5/3}O_4$ | $C_6Li$ | 1:0.4 | 520 | 1.4 | 0.06 |
| A2 | $Li_{4/3}Ti_{5/3}O_4$ | $C_{6.5}Li$ | 1:0.4 | 510 | 1.4 | 0.09 |
| A3 | $LiTi_2O_4$ | $C_6Li$ | 1:0.4 | 505 | 1.5 | 0.08 |
| A4 | $Li_{1.5}Ti_{1.5}O_4$ | $C_{6.5}Li$ | 1:0.4 | 510 | 1.3 | 0.09 |
| A5 | $Li_{4/3}Ti_{5/3}O_4$ | $C_6Li$ | 1:0.20 | 500 | 1.3 | 0.21 |
| A6 | $Li_{4/3}Ti_{5/3}O_4$ | $C_6Li$ | 1:0.25 | 520 | 1.4 | 0.08 |
| A7 | $Li_{4/3}Ti_{5/3}O_4$ | $C_6Li$ | 1:0.45 | 515 | 1.5 | 0.09 |
| A8 | $Li_{4/3}Ti_{5/3}O_4$ | $C_6Li$ | 1:0.50 | 500 | 1.5 | 0.21 |

Results shown in Table 1, FIGS. 2 and 3 show that the batteries of the present invention A1 to A8 have discharge voltage about 1.5V. The ratio of the complex oxide and carbon in the intercalation compound is preferably 1:0.25~1:0.45 by weight.

ADVANTAGE OF THE INVENTION

The present invention provides a low voltage lithium secondary battery which has about 1.5V of discharge voltage.

What is claimed is:

1. A lithium secondary battery comprising a) a positive electrode containing a complex oxide having a composition before initial discharge represented by a formula (I) as an active material

$$Li_xTi_{3-x}O_4 \qquad (I)$$

where $1 \leq x \leq 1.5$;

b) a negative electrode containing an intercalation compound having a composition before initial discharge represented by a formula (II) as an active material

$$C_yLi \qquad (II)$$

where $6 \leq y \leq 6.5$; and c) an electrolyte; wherein a ratio of (1) the complex oxide of the positive electrode to (2) the carbon in the intercalation compound of the negative electrode is 1:0.25 to 1:0.45 by weight.

2. A lithium secondary battery according to claim 1, wherein the complex oxide is $Li_{4/3}Ti_{5/3}O_4$.

3. A lithium secondary battery according to claim 1, wherein the electrolyte is a nonaqueous electrolyte.

4. A lithium secondary battery according to claim 1, wherein the battery has an operating voltage of approximately 1.5V.

5. A lithium secondary battery according to claim 2, wherein the battery has an operating voltage of approximately 1.5V.

6. A lithium secondary battery according to claim 2, wherein the battery has an operating voltage of approximately 1.5V.

7. A lithium secondary battery according to claim 3, wherein the battery has an operating voltage of approximately 1.5V.

\* \* \* \* \*